3,457,221
ORGANOPOLYSILOXANE COMPOSITION
Edward J. Stengle, Jr., Toledo, Ohio, assignor to Owens-Illinois, Inc., a corporation of Ohio
No Drawing. Filed Nov. 21, 1966, Ser. No. 595,577
Int. Cl. C08g 31/16, 31/36
U.S. Cl. 260—46.5                                12 Claims

ABSTRACT OF THE DISCLOSURE

An organopolysiloxane composition containing an organic acid, said composition capable of stabilizing metallic surfaces.

---

This invention relates to an organopolysiloxane composition containing an organic acid. More specifically, this invention relates to a trifunctional organopolysiloxane composition which is capable of stabilizing metallic substrates. By the term "trifunctional organopolysiloxane resin," as used herein and in the appended claims, is meant an organopolysiloxane derived from siloxane-forming (siloxane-formable) trifunctional starting reactant(s).

Organic acids have been utilized in the past as additives for organopolysiloxane resins. For example, see U.S. Patent No. 2,983,700 to Rohm and U.S. Patent No. 2,986,549 to McLaughlin. However, the prior art does not disclose organopolysiloxane compositions which are capable of stabilizing metallic substrates. In the prior art organic acids are utilized for purposes of stabilizing either the organopolysiloxane resin per se or are utilized as catalysts. The organic acid additions in accordance with this invention tend to stabilize certain metallic surfaces in such a way that the natural beauty of the metallic substrate is clearly visible. This natural beauty is retained even though the coating may be cured at elevated temperatures that normally accelerate oxidation and discoloration. Many of the prior art organopolysiloxanes are opaque. In contrast, organopolysiloxanes as utilized in accordance with this invention are clear and transparent and, as such, the natural beauty of the coated metal is clearly visible.

The primary object of this invention is the preparation of a clear, transparent coating for metal which utilizes a trifunctional organopolysiloxane resin composition that has outstanding stabilizing properties.

Other objects of this invention include a process for the manufacture of the coating composition of this invention and a process for coating metal therewith.

Finally, the objects of this invention include all the other novel features which will be obvious from the specification and claims at hand.

The starting material as used in this invention can be either a solid or liquid organopolysiloxane resin.

Organopolysiloxane compounds which are adapted for use in the filled compositions of the subject invention are produced by the hydrolysis and condensation of at least one compound embraced by Formula I (I)
$$T_nSiZ_{(4-n)}$$

wherein T independently generally represents a member such as alkyl, cycloalkyl, alkenyl and aryl. More specifically, T is independently a member such as alkyl, e.g., methyl, ethyl and propyl through hexyl (both normal and isomeric forms), cyclopentyl, cyclohexyl, vinyl, and the normal and isomeric forms of propenyl through hexenyl, and phenyl; Z independently represents an alkoxy group (e.g., methoxy through heptoxy); and $n$ is 1.

In Formula I, as given above for substituent Z, alkoxy groups are preferred because their hydrolysis products are not acidic, and therefore the silane conjoint hydrolysis and condensation can be better controlled. Alkoxy groups of less than 5 carbon atoms are especially advantageous, because the rate of hydrolysis can be inconviently slow when the organic hydrolyzable radical(s) have a higher molecular weight (i.e., more carbon atoms).

The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Specific examples of compounds generically represented by Formula I which are adapted for use in this invention are methyltrialkoxysilanes such as methyltrimethoxysilane, methyltriethoxysilane, ethyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1 - propoxy)silane; phenyltri(2-propoxy)silane, phenyltri(2-methyl-2-propoxy)silane, phenyltri(1-butoxy) silane, and phenyltri(2-butoxy)silane.

A preferred organosilane monomer adapted for use in this invention consists essentially of a compound represented by Formula II.

(II)
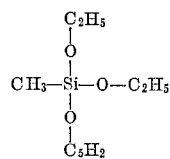

The concentration of water in the initial hydrolysis-condensation reaction mixture containing the compound as represented by Formula II above should be in the range of from about 1.5 moles to about 10 moles of water per mole of silane reactant. Preferably, the amount of water used is from 1.5 to 5.0 moles, still more preferably from 1.5 to 3.0 moles, of water per mole of total silane. Assuming methyltrialkoxysilane is the only monomer, its complete hydrolysis and condensation can be represented as $$CH_3Si(OR)_3 + 3H_2O \rightleftharpoons CH_3Si(OH)_3 + 3ROH$$
$$mCH_3Si(OH)_3 \rightleftharpoons (CH_3SiO_{1.5})m + 1.5mH_2O$$

or overall $$mCH_3Si(OR)_3 + 1.5mH_2O \rightleftharpoons (CH_3SiO_{1.5})m + 3mROH$$

where $m$ is a number corresponding to the degree of polymerization and is greater than 1. Thus, the lower theoretical limit of water is 1.5 moles per mole of silane. Solid heat-softenable organopolysiloxane resins of this invention can be prepared at this concentration, but further decrease in water content of the reaction mixture leads to polymers which are rubbery and soft, presumably due to incomplete hydrolysis and condensation. When the quantity of water is in the preferred range of about 1.5 moles to 5.0 moles of water per mole of silane monomer, the alkanol byproduct formed during hydrolysis acts as a solvent for the other products and reactants, the initially heterogeneous reaction mixture becoming clear and homogeneous. This homogeneity is desirable, since it prevents resin precipitation and allows more uniform control of resin formation. If the water:silane ratio substantially exceeds 5:1, the alkanol formed is insufficient to convert the aqueous medium to a solvent for the reactants and products; therefore, resin precipitation can occur. Insolubility of resinous products at higher water concentrations can be overcome by adding a water-miscible organic solvent such as ethanol, etc. However, at water concentrations above about 10 moles of water per mole of silane monomer, gel formation can occur even if sufficient organic solvent is added to make the reaction mixture homogeneous. The exact upper limit of the water:silane ratio will depend on such factors as silanes used, acid content, time and temperature, etc. Thus, it cannot be set forth precisely, but can be determined by routine test in each case.

Some alkanol by-product must be retained in the reaction mixture during initial hydrolysis and condensation. It is believed that the alkanol formed in the manner indicated by the equations above slows the overall rate of hydrolysis and condensation. This control of the rate of resin formation prevents gel formation and allows preparation of homogeneously highly cross-linked polymers with good dimensional stability.

To avoid gelation and effect hydrolysis and polysiloxane formation of the compound represented by Formula II at a conveniently rapid rate, the acidity of the initial hydrolysis and condensation reaction mixture must be maintained within certain limits hereinafter set forth in detail.

A means of purifying the starting silane monomer II as described above and monomers III and IV as will be described hereinbelow, to insure the right acidity, is distillation from admixture of the monomers with a reagent which will convert acidic species present to nonvolatile compounds. Thus distillation of the monomers from admixture with alkali-metal alkoxides such as sodium ethoxide or methoxide or aqueous dilute alkali or aqueous alkali-metal carbonate is usually suitable. The methods involving aqueous media are of less advantage when the monomer contains silicon-bonded methoxyl groups, because these species hydrolyze rapidly, causing substantial quantities of monomer to be lost during purification. It has also been found that some commercial monomers initially treated by this procedure to give materials of suitably low acidity later increase in acidity during hydrolysis, causing gelation.

A particularly preferred method of purification which avoids these difficulties is distillation from a metal hydride that is preferably lithium aluminum hydride. The hydride destroys all acidic hydrogen species present.

It will be apparent that the actual nature of the various acidic species in commercial methyltrialkoxysilanes and their reaction mixtures cannot always be specified. For convenience, acidity is expressed herein, unless otherwise specifically stated, as parts by weight of HCl per million parts by weight of methyltrialkoxysilane, plus water, or, as abbreviated, "p.p.m. hydrochloric acid" or "p.p.m. HCl." However, it is to be understood that this language is not intended to imply that Hcl is the only or even one of the acidic species present. Acid content of the monomer alone, when determined, was measured as follows:

To 25 ml. of toluene was added 13 drops of a 0.04% methanol solution of bromcresol purple, and the resultant mixture was titrated to a blue-violet endpoint with 0.02 N potassium hydroxide. A 10.0-ml. sample of methyltrialkoxysilane was pipetted into the solution thus obtained, and the resultant mixture was titrated to the same blue-violet endpoint with 0.02 N potassium hydroxide; a similar 10.0-ml. sample of methyltrialkoxysilane was rapidly weighed. Under these conditions, acidity of the monomer alone is calculated as $A-729$ $V/S$, where A is acid content in parts by weight (grams) of HCl per million parts by weight (grams) of methyltrialkoxysilane (assuming entire sample is the silane), V is volume of alkali used in second titration described, and S is weight of sample in grams.

Initial hydrolsis and condensation is conveniently carried out by placing in a flask pure water, and methyltrialkoxysilane, whose acid content has been suitably adjusted by one of the means just described, and heating the resultant mixture under reflux. The initially cloudy reaction mixture clears on heating, usually within an hour, because alcohol formed as a hydrolysis by-product dissolves the other components of the mixture. A suitable degree of hydrolysis and condensation is usually obtained if reflux is allowed to proceed for about one to four hours after the mixture clears. This step can be carried out at lower temperatures, but the rate is substantially slower.

The upper limit of permissible acid content during this initial hydrolysis and condensation is that beyond which gel formation occurs. The lower limit is determined by the desired reaction time. In general, the minimum reaction time to obtain satisfactory products is about one hour of reflux. Maximum and minimum allowable acid contents vary with the ratio of methyltrialkoxysilane and water used. The lower theoretical water content is $Y/2$, where Y is the average number of alkoxy groups attached to silicon throughout the mixture. Thus, when methyltrialkoxysilane is the sole silane constituent, the theoretical lower molar ratio of silane:water is 1:1.5. When the molar silane:water ratio is 1:1.5, the minimum allowable acid content is about 50 parts of HCl per million parts of total methyltrialkoxysilane and water, and the maximum is about 650–700 parts on this same basis. When the molar silane:water ratio is 1:3.0, the minimum allowable acid content ranges from a small positive amount which may be a very slight trace less than 1 p.p.m. HCl, e.g., 0.1–0.01 p.p.m. HCl; or it may be from 1 p.p.m HCl up to about 5 p.p.m. HCl or a little higher such as 10 p.p.m. HCl.

These limits have been carefully established but are necessarily subject to minor variation in each case, for several reasons. First, use of other alkoxysilanes as co-monomers in amounts previously specified can reduce acid sensitivity, since methyltrialkoxysilanes are most acid labile, but the effect will generally be small. Second, extremely small quantities of impurities in a given sample, impractical to remove, can alter acid sensitivity slightly. These factors, however, affect only the maximal and minimal extremes of allowable acid content, and the major portion of the suitable area indicated will be unchanged.

It is usually most convenient to reduce the acid content of the monomers to about zero weight part per million HCl by one of the methods previously described and, if necessary or desirable (as it usually is), then adjust the acidity of the initial reaction mixture by adding acid to the water used in the calculated amount required to impart the desired acidity to the starting mixture. For this purpose hydrochloric acid is preferred. Organic acids such as phenol and formic acid can also be used.

Another preferred organosilane reactant material for use in accordance with this invention is a mixture of compounds as represented by Formulae III and IV:

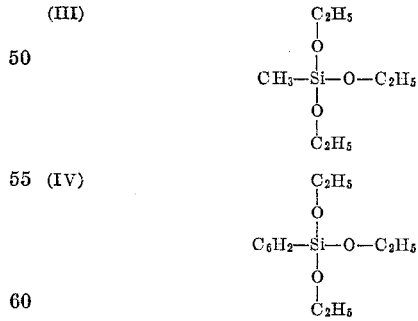

wherein $C_6H_5$ is phenyl. During the in situ hydrolysis and polymerization, compounds III and IV link together by conjoint hydrolysis and condensation to form a copolymer. The molar ratio of the compound as represented by Formula III to the compound as represented by Formula IV can be from 1:10 to 10:1, with a more preferred ratio being about 1:5 to 5:1. A most preferred composition is produced by the hydrolysis and condensation of about 2 moles of the compound as represented by Formula III with about one mole of the compound as represented by Formula IV.

To avoid premature gelation of the resins, the quantity of acid in the reaction mixture must be below about 0.01 mole of acid per mole of hydrolyzable silanol precursor.

Thus, it may be of the same order of magnitude as hereinbefore described with reference to the production of organopolysiloxanes from silanes of the kind embraced by Formulae I and II. Similarly, a solvent, e.g., ethanol, can be added to render the reaction mixture homogeneous.

The preferred water concentration for consideration in the production of copolymers made from monomers represented by Formulae III and IV above is from about 1.5 to about 3 moles with a most preferred concentration being about 3 moles for every mole of total silane monomer present in the reaction mixture.

A further variation in the procedure can be achieved by hydrolyzing individually a hydrolyzable methyltrialkoxysilane and a hydrolyzable phenyltrialkoxysilane, and then combining the resultant hydrolysis products to form the initial reaction mixture described above.

The subject monomeric organosilane compounds that are represented by Formulae I, II, III and IV can be converted into the modified organopolysiloxane compositions of the present invention by the following general procedure. The organosilane compound or compounds are hydrolyzed and partially condensed at a temperature of from about 50° to about 80° C., for a period of time of from about 1 to about 10 hours, in the presence of at least a trace of acid and at least about 1.5 moles of water per mole of silane. This hydrolysis of compounds as represented by Formulae I to IV above is carried out in the presence of water as discussed above. The reaction then proceeds with distilling for a period of time of from about 1 to about 30 minutes to effect the removal of the by-product alcohol and excess water and thereby concentrate the solution of the partial condensation product of the above-described reaction. The concentration step effects the further condensation of the liquid organopolysiloxane partial condensation product. The concentrated organopolysiloxane product is then precured (advanced in cure without gelation) at a temperature of from about 90 to about 250° C. for a period of time of from about ½ to about 24 hours to provide a liquid siloxane partial condensation product that is capable of being further cured to a thermoset resin. The organic acid additions in accordance with this invention are added to the precured resin. After application, this precured product is then cured at a temperature of from about 90 to about 200° C. for a period of time of from about 4 to about 68 hours.

The invention at hand is also adapted to utilize a powdered heat-softenable solvent-soluble form of the above-described organopolysiloxane resins. These heat-softenable solvent-soluble organopolysiloxane resins can be produced by the alteration of the above-described partial curing step and by the alteration of the curing step. More specifically, if the partial curing step is carried out at a temperature of from 10–20° C. below the gel point of the resin, on cooling to room temperature a heat-softenable solvent-soluble resin results. Likewise, a heat-softenable solvent-soluble resin will result when condensation and partial curing steps are carried out as described above, but the cure is interrupted before complete polymerization is effected. Upon formation, these heat-softenable solvent-soluble materials are white powders. These powders can be converted to a solid material by the application of at least one of heat and pressure. Temperatures of from about 250° F. to about 500° F. can be utilized along with any convenient pressure.

The composition and preparation of the monomeric organosilane compounds and their subsequent polymerization and copolymerization are fully discussed in copending United States patent application, Ser. No. 306,-344, filed Sept. 3, 1963, now abandoned United States patent application, Ser. No. 370,684, filed May 27, 1964, now abandoned United States patent application, Ser. No. 520,893, filed Jan. 17, 1966, now abandoned and United States patent application, Ser. No. 545,579, filed Apr. 27, 1966, now Patent No. 3,395,117, these applications having an assignee that is common with the assignee of this invention.

The formulation, polymerization and application of the monomeric organosilane compounds and organopolysiloxane compositions of this invention are carried out in the presence of a solvent such as methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

Suitable organic acids are those having at least one carboxylic group and preferably three and at least one hydroxy group. As organic acid additives in accordance with the subject invention, citric, gluconic, and tartaric acids are preferred. Citric acid is the most preferred acid for use in conjunction with copper surfaces.

The compositions of the invention at hand can comprise from about 0.1 to about 2 weight percent organic acid. A more preferred range of the organic acid addition is from about 0.1 to about 1 percent. A most preferred concentration consists essentially of an organic acid addition of about 0.1 weight percent. The foregoing percentages are based on the total weight of organopolysiloxane solids and organic acid additive.

It is believed that the organic acid complexes the metallic oxide surface via a complex ion formation or cordinate covalent bonding and thereby prevents further oxidation and discoloration during heat-cure processing which normally accelerates further oxidation. The result of this stabilization is that organopolysiloxane coatings can be used on metallic surfaces without the discoloration of said surfaces.

The coating composition of this invention can be advantageously modified with small percentages of a polyamide (i.e., a condensation polymer containing repeating

groups as an integral part of the polymer chain). These small percentages of a polyamide regulate the flexibility of the coating composition by reacting with the organopolysiloxane resins.

Modifying polyamides which are adapted for use in accordance with this invention are represented by Formulae V and VI:

(V) 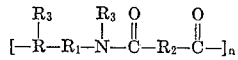

(VI) 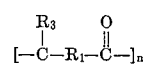

wherein $R_1$ and $R_2$ are independently straight chain alkylene $C_1$–$C_{20}$, and $R_3$ is hydrogen and/or $CH_2OR$ groups being randomly distributed along the polymer chain. A preferred range for the ratio of H to $CH_2OR$ is from about 3:1 to about 1:1. A most preferred ratio is about 2:1, R being hydrogen, straight chain alkyl $C_1$–$C_6$ or aryl, $n$ is an integer such that the number average molecular weight of the resulting polymer is from about 2,000 to about 50,000, a more preferred range being from about 8,000 to about 12,000, with a most preferred molecular weight being about 10,000.

One preferred polyamide which is adapted for use in the subject organopolysiloxane composition is a polyamide sold under the trademark BCI 819 by the Belding Chemical Industries.

The primary structure of this preferred polyamide is as represented in Formula VII:

(VII) 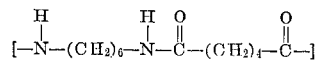

This polyamide is prepared from hexamethylenediamine and adipic acid, with methoxymethyl and some methylol substitution occurring at the amide hydrogen of 6—6 backbone chain.

Analysis of this polyamide shows that the methoxyl concentration in methoxymethyl (>N—CH$_2$—OCH$_3$) is from about 7.75 to about 8 percent: methylol substitution (>N—CH$_3$—OH) is from about 0.5 to about 2.84 percent; the total substitution of N—H groups in the polymer is from about 3.8 percent to about 46 percent; and the number average molecular weight is about 9,800 to about 11,750.

The above polyamides are described as alkoxyalkyl-substituted condensation polymers wherein alkoxymethyl groups replace the amide hydrogen in the polyamide chain, rendering the polymer soluble in lower alcohols, phenols and solvent systems containing co-solvents. Water improves the solubility of these polyamides; hence, water is usually present in a 5% concentration. These polyamides exhibit high tensile strength, toughness, and flexibility, properties which are advantageous in modifying the physical characteristics of the organopolysiloxane coatings of this invention.

For use on metallic surfaces, the use of a polyamide modifier is preferred. Up to 10 percent of a polyamide can be present in the subject composition. This polyamide additive is discussed in detail in an application Ser. No. 595,642 entitled "Polyamide-Modified Organopolysiloxane Composition," said application has an assignee which is common with the assignee of this invention and is being filed concurrently with the subject application.

It is within the purview of this invention to add to the compositions of this invention compatible materials which do not affect the basic and novel characteristics of the composition of this invention. Among such materials are coloring agents, including dyes and pigments, fillers and similar additives. Additives such as antioxidants, antistatic agents, stabilizers and antifoaming agents may also be added. The upper limit of the quantity of additives is usually about 50 weight percent of the product.

With regard to these additions, it should be specifically noted that various percentages of glare-reducing components such as silica can be added to the subject organopolysiloxane composition. These additions generally convert a high gloss surface into a surface which has a dull, flat appearance.

When used as a coating, the composition of the subject invention can be applied to many types of metallic surfaces. For example, said composition can be applied to metals such as magnesium, titanium, zirconium, vanadium, chromium, tungsten, manganese, iron including steel and stainless steel, copper, nickel, vanadium, platinum, cobalt, silver, gold, zinc, cadmium, aluminum including annodized aluminum, tin, lead, etc.

The coating composition of this invention is particularly advantageous when used as a metallic coating wherein the surface being coated is to be utilized for decorative purposes.

The following examples will illustrate the subject invention. These examples are given for the purpose of illustration and not for purposes of limiting this invention. (All parts and percentages are given by weight unless otherwise specified.)

Examples 1–16

The data for these examples are listed in Table I. The compositions of these examples were prepared in accordance with the following description. An organopolysiloxane reaction product was prepared by the hydrolysis and subsequent condensation of an organosilane monomer or combination of monomers as shown in Formulae II, III and IV above. Specifically, whenever a mixture of methyl and phenyl monomers was utilized a copolymer was prepared in accordance with the description given in conjunction with Formulae III and IV above. The hydrolysis and condensation products were then rapidly heated to 140° C. with stirring in an open beaker to remove the alcohol by-product and water. The resulting partially condensed organopolysiloxane was held at 100 to 120° C. and solvent such as a lower alcohol, preferably ethanol, containing 5% water, was then added with stirring. If a polyamide was used, it was first heated in the alcohol solvent at 60 to 65° C. until dissolved before the alcohol-polyamide mixture was added to the partially condensed organopolysiloxane. The polyamide utilized in these examples was BCI 819 which is a linear polyamide produced from hexamethylene diamine and adipic acid, with the substitution occurring at the amide hydrogen. The polymer likewise shows some incidence of methoxymethyl and methylol substitution. When the solution was complete, the beaker was covered and allowed to cool to room temperature. Any solvent lost by evaporation was repaced. The organic acid additive was added to obtain a pH of 4.0 to 4.5. The solution was filtered prior to use as a coating.

Surface preparation of metal test panels

Copper and brass.—A commercial copper cleaner such as "Twinkle" was used to remove metal oxides and produce a bright, lustrous surface. The cleaner was removed with a hot water rinse, dried wih a cellulose tissue and given a final solvent rinse consisting of 75 parts toluene, 24 parts acetone, and 1 part butyl acetate. A copper cleaner that is a solution of 18 parts by volume of ferric chloride (42% solution), 32 parts by volume of concentrated nitric acid, and 200 parts by volume of water also can be used to clean the copper surface as described for instance on page 20 of Concise Guide To Structural Adhesive by Werner H. Guttmann, Reinhold Publishing Corporation, New York, N.Y., 1961.

Aluminum.—The aluminum test panels were rinsed with the above copper cleaning solvent and wiped dry with a cellulose tissue.

Stainless.—The stainless test panels were immersed in 0.5% "Alkanox" detergent solution at 180° F. for 10 minutes, rinsed with distilled water, and wiped dry with a cellulose tissue.

Coating procedure

Organopolysiloxane-polyamide solutions were applied to metal test panels using a dip-coat technique. The coating or film thickness deposited was controlled using a dip-coating apparatus with a controlled adjustable speed drive. (1.8 to 22 seconds per inch of travel.) The test panel, usually 3 x 6 inches, was immersed into a receptacle containing the coating solution, allowed to stand 2 to 3 seconds to assure uniform wetting, and extracted at a speed designed to produce the required thickness. Solution viscosity based on solvent used and solids concentration is an important parameter. The coated panels were allowed to air-dry 1–5 minutes for solvent evaporation and then cured in a convection or air-circulating oven at temperatures of 90 to 225° C. from 2 minutes to 48 hours.

Testing procedure

The outdoor weathering tests were conducted, using an Altas XW-R Weather-Ometer. These tests were conducted in accordance with ASTM–G1499–64, entitled "Operating Light and Water Exposure Apparatus," using six carbon arcs. E–42 standard spec., 121499–64 covers specific variations as used in these tests.

The conditions of the test were Type 1 Ia Exposure of Plastics. The testing sequence was as follows:

Cycle 1.—Test specimens 3 x 9⅛ inch were mounted on a cylinder and the coated side exposed to a light source of six carbon arcs for 50 minutes. This light source generates the proper wave length at a black panel temperature of 148±2° F.

Cycle 2.—After exposure to the light source for 50 minutes, the cycle was changed to a dark environment, void of light, maintained at 100% R.H. Simultaneously, the back side of the panel was continuously sprayed with 45° F. water, causing a condensation of water on the coated side. After 60 minutes, the cycle was again changed to the light source. The total time to failure includes both the light and dark cycles.

In the dielectric breakdown test of the coatings on metal substrates, the voltage was supplied by a G.E. 15 kv. transformer 60 v. capacity equipped with an ammeter and current limiting resistor. These tests were generally conducted in accordance with ASTM D149-61. However, the voltage increase was manually controlled, not programmed, as is the above-described ASTM test. Likewise, spherical electrodes were used, not flat discs as in the ASTM specification.

A general description of the test is as follows: a clamp electrode is attached to the uncoated portion of the test panel, the spherical electrode placed on the coating, and the voltage increased manually until a breakdown occurs. The breakdown was conducted as a function of coating thickness. Both dry and wet surfaces were evaluated.

The impact flexibility of the subject coatings was tested with a G.E. impact flexibility tester. This instrument generally determines the relative flexibility of a paint, varnish or enamel film expressed as percentage elongation, in a range of 0.5 to 60% as based on the impact of a solid metal cylinder dropped through a guide track from a height of 4 feet onto the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

The flexibility was tested by bending the coated panels 180° back on itself.

The viscosity in centipoises (CPS) was measured with a RVF Brookfield viscometer in accordance with ASTM-2196-63T—"Rheological Properties of Non-Newtonian Liquids."

The coating hardness on metal substrates was determined with Model C Sward Hardness Rocker. This instrument generally tests the hardness and drying time of coating materials by responding to damping differences in resilient surfaces. These tests were conducted in accordance with ASTM-D2134-62T—"Softening of Organic Coating by Plastic Compositions."

The adhesion of the coatings to metal substrates was tested with the Scotch tape test wherein the tape is uniformly applied to a coated surface which has been cross-cut with a razor knife, then pulled off rapidly at 180°. Coatings which exhibit good adhesion do not peel, whereas those not bonded to the substrate peel in the cross-cut area where the coating is not continuous.

In addition to the above-described test the color retention of the coatings after coating and curing was noted. In Table I, "very good" indicates no discoloration, "good" indicates slight discoloration and "poor" indicates substantial discoloration.

TABLE I.—ORGANOPOLYSILOXANE CONTAINING AN ORGANIC ACID

[Color stability and Coating properties of Copper and Brass Flat Stock Coated with Organopolysiloxane Compositions Containing Organic Acids]

Coating Composition: Solids, 25–50 parts; Solvent, ethanol/water (95/5 parts)
Coating Thickness (mils), 0.4–0.6
Cure Temperature, °C., 175° (convection oven)

| Example | Composition (parts) | | | | Organic acid | Solvent | Parts | Coating Substrate | Cure time (min.) | Color Retention | Flexibility 180° bend | Adhesion Scotch tape test | Dielectric strength (volts) | | Atlas XW-R weatherometer failure time (hours) | Sward hardness |
|---|---|---|---|---|---|---|---|---|---|---|---|---|---|---|---|---|
| | Organopolysiloxane | | Phenyl | Polyamide BCI 819 | | | | | | | | | Dry | Wet | | |
| | Methyl | | | | | | | | | | | | | | | |
| 1 | 100 | | | | Citric | 100 | 1 | Copper | 30 | Very good | No cracking | No peeling | | | | |
| 2 | 100 | | | | Gluconic | 100 | 1 | do | 30 | do | do | do | | | | |
| 3 | 100 | | | | Tartaric | 100 | 1 | Brass | 30 | Good | do | do | | | | |
| 4 | 100 | | | | Citric | 100 | 1 | do | 30 | Very good | do | do | | | | |
| 5[1] | 100 | | | | None | 100 | 1 | Copper | 30 | Poor | Cracks | do | 2,000–2,500 | 500–1,000 | <100 | 30–35 |
| 6[1] | 100 | | | | do | 100 | 2 | Brass | 30 | do | do | do | | | | |
| 7 | 66¾ | | 33⅓ | | Citric | 300 | 2 | Copper | 30 | Very good | No cracking | do | | | | |
| 8 | 66⅔ | | 33⅓ | | Gluconic | 300 | 1 | do | 30 | Good | do | do | | | | |
| 9 | 66⅔ | | 33⅓ | | Citric | 100 | 1 | Brass | 30 | do | do | do | | | | |
| 10[1] | 66⅔ | | 33⅓ | | None | 300 | 2 | Copper | 30 | Poor | Cracks | do | | | | 45–50 |
| 11 | 66⅔ | | 33⅓ | | Citric | 100 | 1 | Brass | 30 | do | No cracking | do | 2,500–3,200 | 1,000–1,500 | | 52–56 |
| 12 | 63⅓ | | 33 | 1 | do | 100 | 1 | Copper | 30 | Very good | do | do | 3,500 | 300–950 | | 60 |
| 13 | 63⅓ | | 31¼ | 5 | do | 100 | | do | 15 | do | do | do | 3,000–4,000 | 1,000–2,000 | | |
| 14[1] | 66 | | 33 | 1 | None | 100 | | do | 30 | Poor | do | do | 1,200–3,500 | Conductive | | 50 |
| 15 | 99 | | | 1 | Citric | 100 | 2 | do | [2]12 | Very good | do | do | | | | |
| 16 | 95 | | | 5 | do | 300 | 2 | do | [3]7 | do | do | do | 2,800–3,500 | 300–800 | >1,400 | 40–45 |

[1] = Controls.
[2] and [3] = Double coatings:

| | (2) | (3) |
|---|---|---|
| First coat | 2 min. | 2 min. |
| Second coat | 10 min. | 5 min. |

What is claimed is:

1. An organopolysiloxane composition of matter which is produced by the steps of:
    (I) heating a mixture of
        (A) silanes which are members selected from the group consisting of methyltrialkoxysilane, ethyltrialkoxysilane, and mixtures of methyltrialkoxysilane and phenyltrialkoxysilane; and in which the alkoxy group contains from 1 to 6 carbon atoms, inclusive;
        (B) at least a trace of acid and at least about 1.5 moles of water for every mole of total silane present, at a temperature of from about 50° to about 80° C. for a period of time of from about 1 to about 10 hours;
    (II) adding an organic acid that is a member selected from the group consisting of citric, gluconic and tartaric; and
    (III) curing the product of step II by heating to a temperature of from about 90 to about 200° C. for a period of time of from about 4 to about 168 hours.

2. An organopolysiloxane composition of matter which is produced by the steps of:
    (I) heating a mixture of
        (A) methyltrialkoxysilane in which the alkoxy group contains from 1 to 6 carbon atoms;
        (B) at least a trace of acid and at least about 1.5 moles of water for every mole of total silane present, at a temperature of from about 50° to about 80° C. for a period of time of from about 1 to about 10 hours;
    (II) concentrating the siloxane partial condensation product from step I to remove some but not all volatile material including alkanol by-product and some water and to obtain a liquid residue;
    (III) adding an organic acid that is a member selected from the group consisting of citric, gluconic and tartaric; and
    (IV) curing the product of step III by heating to a temperature of from about 90 to about 200° C. for a period of time of from about 4 to about 168 hours.

3. An organopolysiloxane composition of matter which is produced by the steps of:
    (I) heating a mixture of
        (A) silanes which are members selected from the group consisting of methyltrialkoxysilane, ethyltrialkoxysilane, and mixtures of methyltrialkoxysilane and phenyltrialkoxysilane; and in which the alkoxy group contains from 1 to 6 carbon atoms, inclusive;
        (B) at least a trace of acid and at least about 1.5 moles of water for every mole of total silane present, at a temperature of from about 50° to about 80° C. for a period of time of from about 1 to about 10 hours;
    (II) concentrating the siloxane partial condensation product from step I to remove some but not all volatile material including alkanol by-product and some water and to obtain a liquid residue;
    (III) precuring the product of step II at a temperature of from about 10° to about 40° C. below the gel point of the resin for a period of time of from about 1 second to about 60 minutes;
    (IV) adding a citric acid to the product of step III; and
    (V) curing the product of step IV by heating to a temperature of from about 90 to about 200° C. for a period of time of from about 4 to about 168 hours.

4. A composition as defined in claim 2 in which the organic acid is citric acid.

5. A composition as defined in claim 1 in which the organic acid is tartaric acid.

6. A composition as defined in claim 1 in which the organic acid is gluconic acid.

7. A composition as defined in claim 1 in which the organic acid is citric acid.

8. An article having a metallic surface that is coated with the composition of claim 1.

9. An article as defined in claim 8 in which the organic acid is citric.

10. An article as defined in claim 8 in which the metallic surface is copper.

11. A coating composition comprising a solvent-soluble, further curable siloxane partial condensation product and an organic solvent therefor, the siloxane condensation product being produced by the steps of:
    (I) heating a mixture of
        (A) silanes which are members selected from the group consisting of methyltrialkoxysilane, ethyltrialkoxysilane, and mixtures of methyltrialkoxysilane and phenyltrialkoxysilane; and in which the alkoxy group contains from 1 to 6 carbon atoms, inclusive;
        (B) at least a trace of acid and at least about 1.5 moles of water for every mole of total silane present, at a temperature of from about 50° to about 80° C. for a period of time of from about 1 to about 10 hours; and
    (II) adding an organic acid that is a member selected from the group consisting of citric, gluconic and tartaric.

12. A coating composition as defined in claim 11 in which the organic acid is citric acid.

No references cited.

DONALD E. CZAJA, Primary Examiner

M. I. MARQUIS, Assistant Examiner

U.S. Cl. X.R.

117—49, 135.1, 161; 260—37, 45.85, 824

PO-1050
(5/69)

UNITED STATES PATENT OFFICE
CERTIFICATE OF CORRECTION

Patent No. 3,457,221                     Dated   July 22, 1969

Inventor(s)   Edward J. Stengle, Jr.

It is certified that error appears in the above-identified patent and that said Letters Patent are hereby corrected as shown below:

Column 2, line 3, "inconviently" should read -- inconveniently -- ; line 32, that portion of Formula II reading "$C_5H_2$" should read -- $C_2H_5$ -- .  Column 3, line 49, "Hcl" should read -- HCl -- .  Column 4, that portion of Formula IV reading "$C_6H_2$" should read -- $C_6H_5$ -- .  Column 5, line 60, remove the period after "lymerization".  Column 6, line 29, "cordi-" should read -- coordi -- ; that portion of Formula V, reading $$[-\overset{R_3}{\underset{|}{R}}-R_1 \quad \text{should read} \quad [-\overset{R_3}{\underset{|}{N}}-R_1$$

Column 6, formula VI, that portion of the formula reading $$[-\overset{R_3}{\underset{|}{C}}-R_1 \quad \text{should read} \quad [-\overset{R_3}{\underset{|}{N}}-R_1$$

Column 7, line 3, insert -- the -- at end of the line.
Column 8, line 18, "paced" should be -- placed -- ; line 33, "Adhesive" should be -- Adhesives -- .  Column 12, line 49, "No references cited" should read -- References cited --

U. S. Patent Nos.
3,257,330   6/1966   Burzynski et al
3,384,599   5/1968   Omietanski et al
3,389,121   6/1968   Burzynski et al
3,395,117   7/1968   Burzynski et al
3,354,095  11/1967   Burzynski et al
3,367,910   2/1968   Newing, Jr.

SIGNED AND
SEALED
APR 28 1970

(SEAL)
Attest:

Edward M. Fletcher, Jr.
Attesting Officer

WILLIAM E. SCHUYLER, JR.
Commissioner of Patents